(No Model.)
H. A. DAVIS.
BICYCLE.
No. 379,373. Patented Mar. 13, 1888.
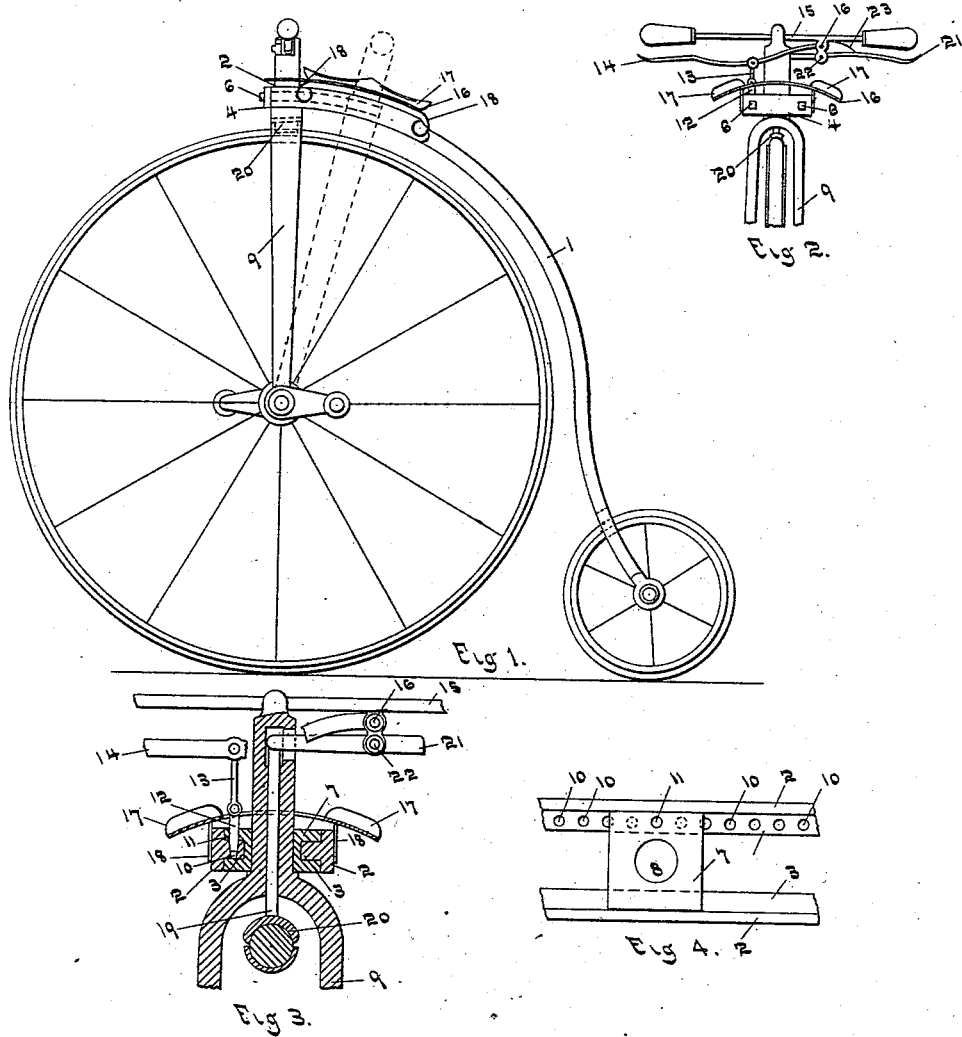

UNITED STATES PATENT OFFICE.

HENRY A. DAVIS, OF UTICA, NEW YORK.

BICYCLE.

SPECIFICATION forming part of Letters Patent No. 379,373, dated March 13, 1888.

Application filed October 5, 1887. Serial No. 251,488. (No model.)

*To all whom it may concern:*

Be it known that I, HENRY A. DAVIS, a citizen of the United States, and a resident of the city of Utica, in the county of Oneida and State of New York, have invented a certain new and useful Improvement in Bicycles; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in bicycles, and consists in the mechanism hereinafter described and claimed.

In the accompanying drawings, Figure 1 represents a side elevation of my improved bicycle. Fig. 2 represents a front elevation of a portion of the same. Fig. 3 represents a front elevation of a portion of my machine, the fork-head, backbone, adjustable forked bearing, seat-frame, brake-shoe, wheel-rim, and tire being shown in vertical section on the central line of the fork. Fig. 4 represents a plan view of a portion of the backbone and the adjustable fork-bearing located therein.

Like figures of reference refer to like parts in the several views presented.

Referring specifically to the drawings in describing the construction of my invention, 1, Fig. 1, represents the "backbone" of the bicycle. This is of any ordinary approved shape, except at its upper end, where a portion of it is forked, as shown at 2, Figs. 1, 3, and 4. The opposing inner walls or sides of this fork are provided with projecting flanges or ribs, as shown at 3, Figs. 3 and 4. The upper or outer end of the forked backbone (which must be opened to admit of the introduction of the adjustable forked bearing hereinafter described) is closed or capped by the cap-plate 4, Figs. 1 and 2, which cap-plate is secured to the end of the forked backbone by the bolts 6 or their equivalents.

Located between the opposing walls of the forked end of the backbone and interlocking of the flanges thereon, as plainly shown in Fig. 3, is the adjustable forked bearing 7, Figs. 3 and 4. This is so fitted in the backbone as to freely move longitudinally within certain limits therein.

Bearing 7 is an appropriate block of metal having a suitable perforation, 8, Fig. 4, to form a bearing for the neck of wheel-fork 9, Figs. 1, 2, and 3, and provided with proper grooves or recesses to engage the projecting flanges on the inner walls of the forked backbone, as shown in Figs. 3 and 4. To limit the movement of bearing 7 in the forked backbone, and rigidly locked or secured in any desired position, I provide the following mechanism: Reference to Figs. 3 and 4 will show that one of the inwardly-projecting flanges of the forked backbone is provided with a series of perforations, 10. These perforations are made slightly conical, for a reason that will hereinafter appear. I also provide bearing 7 with a cylindrical perforation, 11, Figs. 3 and 4. This perforation 11 can, by longitudinal movement of bearing 7, be brought into coincidence with any one of the perforations 10. Fitting perforation 11 in such manner as to be free to move vertically therein is the conical pointed pin 12, Figs. 2 and 3. This pin 12 is flexibly connected, by means of link 13 or its equivalent, with hand-lever 14, Figs. 2 and 3. Lever 14 is pivoted to handle-bar 15 by means of lug 16, which is attached to and projects from the handle-bar. It is evident that upward movement of the lever 14 will retract pin 12 from engagement with perforations 10 and allow bearing 7 to move longitudinally between the walls of the forked ends of the backbone. The conical point of pin 12, in connection with a conical shape or perforation, 10, with which it engages, furnishes a means of compensating for any wear that may occur in either pin or perforation. Link 13, or its equivalent, is loosely connected with pin 12 and lever 14, so that a certain amount of rotary motion can be imparted to fork 9 without cramping the link, pin, and lever referred to. Suitably journaled in perforation 8 of bearing 7, Fig. 4, is the neck of the wheel-fork 9, which is capable of a necessary amount of rotary movement to guide the machine.

In order to admit of the change of position of wheel-fork 9, as indicated by dotted lines in Fig. 1, a special construction of the seat or saddle is necessary. This I construct in the following manner: I provide a metallic frame, 16, Figs. 2, 3, and 4, of open approximately rectangular shape, which I mount upon the backbone in such manner that the wheel-fork neck shall pass through the same and be free to move longitudinally between the sides of the same, as shown in Fig. 3. Upon the upper surface of the frame 16, I secure the padded seat 17, Figs. 1, 2, and 3. The frame 16 is flexibly and elastically attached and secured to the backbone by the springs 18, or their equivalents. The seat is formed in two sections and located so as to allow the fork-head to be moved through the seat.

The brake mechanism I construct as follows: The forked neck is centrally perforated to admit of the reception of brake-spindle 19, Fig. 3, which is free to move vertically therein. Attached to the lower end of spindle 19 in such manner as to be free to partially rotate thereon and at the same time be secured against lateral movement is the brake-shoe 20, Figs. 1, 2, and 3. The upper end of spindle 19 is pivoted to lever 21, Figs. 2 and 3, which lever is fulcrumed at 22 to a lug projecting from and attached to or a part of the handle-bar 15. A spring, 23, Fig. 2, is provided to normally retain the brake out of contact with the rim or periphery of the large wheel. A spring (not shown) may also be used for holding down the free end of lever 14. Upward movement of the free end of lever 21 applies the brake in the usual manner.

Having described the construction of my invention, its operation is as follows: In riding downhill, or in what is technically known as "coasting," it is desirable that the center of gravity of the rider should be as far back of the main axle of the machine as possible, and in riding uphill it is desirable that the rider should be as nearly over the main axle of the machine as possible, as a much steeper hill can be surmounted in this manner than when the rider is seated back of the center of the axle of the machine, and greater speed can be attained on a level road by the use of my machine, as the rider is enabled by the use of my machine to place himself in the most favorable position for speed. Assuming the rider in his normal position and the wheel-fork 9 in the position shown in full lines in Fig. 1, and it becomes desirable for the rider to place the wheel-fork in the position shown in dotted lines in Fig. 1, the rider slips back into the back portion of the seat, and simultaneously therewith raises the free end of lever 14, which retracts pin 12 from perforation 10 in the flange of the backbone and enables him to swing fork 9 into the position shown in dotted lines in Fig. 1, or any intermediate position. When properly located, fork 9 can be locked in position by releasing lever 14 from the grasp of the rider, when pin 12 enters perforation 10 and holds bearing 7 firmly in position in the forked end of the backbone.

The increased safety due to the use of my device, together with the ease afforded the rider by the change of position possible by its employment, furnishes advantages apparent to every user of the bicycle.

It is evident that various structural modifications and changes could be made in the construction of my device without departure from the central feature or spirit of my invention, which is the means whereby the center of gravity of the rider and machine can be changed at the will of the rider. Hence I do not limit or confine the broad scope of my invention or the manner of its construction to the precise specific combination, conformation, or construction of parts herein set forth and described.

What I claim as new, and desire to secure by Letters Patent, is—

1. The combination, in a bicycle, of the forked or slotted end of the backbone, the movable bearing fitted to move in the slotted end of the backbone, and the wheel-fork, the upper end of the fork passing through the movable bearing and the forked or slotted end of the backbone, substantially as set forth.

2. The combination, in a bicycle, of a backbone having a forked or slotted end, a movable bearing fitted to move in the forked or slotted end of the backbone, and the wheel-fork having its head or upper end passing through the movable bearing, substantially as set forth.

3. The combination, in a bicycle, of a backbone having a forked or slotted end, a movable bearing adapted to move in the forked or slotted end of the backbone, a wheel-fork having its head or upper end adapted to fit and rotate in the movable bearing, the head passing through the fork or slot in the backbone, and a brake spindle passing through the head or upper end of the wheel-fork, operated by a lever, substantially as set forth.

4. The combination, in a bicycle, of a backbone having a forked or slotted end, a movable bearing fitted to move in the forked or slotted end of the backbone, a pin and perforations for securing the movable bearing in a fixed position when adjusted, and the wheel-fork having its head or upper end passing through the movable bearing, substantially as set forth.

5. The combination, with the adjustable fork-head, of the seat formed in two sections and so located as to allow the fork-head to move between the sections.

In witness whereof I have affixed my signature in presence of two witnesses.

HENRY A. DAVIS.

Witnesses:
L. F. STUART,
MILTON E. ROBINSON.